United States Patent
Ben-Eli

(10) Patent No.: US 8,385,294 B2
(45) Date of Patent: Feb. 26, 2013

(54) DYNAMICALLY RECONFIGURABLE RECEIVER

(75) Inventor: David Ben-Eli, Modiin (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 1358 days.

(21) Appl. No.: 12/044,711

(22) Filed: Mar. 7, 2008

(65) Prior Publication Data

US 2008/0220819 A1    Sep. 11, 2008

Related U.S. Application Data

(60) Provisional application No. 60/893,799, filed on Mar. 8, 2007, provisional application No. 60/914,516, filed on Apr. 27, 2007.

(51) Int. Cl.
  *H04B 1/00*    (2006.01)
(52) U.S. Cl. .......... 370/334; 455/69; 455/423; 455/574; 370/332; 370/333
(58) Field of Classification Search ................ 455/69, 455/522, 455, 423, 574; 370/332–334
  See application file for complete search history.

(56) References Cited

U.S. PATENT DOCUMENTS

| | | | |
|---|---|---|---|
| 7,010,321 B2* | 3/2006 | Chi et al. ................ | 455/522 |
| 7,756,542 B1* | 7/2010 | Kaiser et al. ............ | 455/522 |
| 7,929,921 B2* | 4/2011 | Love et al. .............. | 455/101 |
| 2003/0190924 A1 | 10/2003 | Agashe et al. | |
| 2004/0253955 A1 | 12/2004 | Love et al. | |
| 2007/0042719 A1* | 2/2007 | Campo Camacho et al. ... | 455/69 |

FOREIGN PATENT DOCUMENTS

| WO | WO 01/05088 A1 | 1/2001 |
|---|---|---|
| WO | WO 03/030403 A1 | 4/2003 |

\* cited by examiner

*Primary Examiner* — Ajit Patel
*Assistant Examiner* — Julio Perez

(57) ABSTRACT

Aspects of the disclosure describe a cellular transceiver that can include multiple diversity branch receivers that receive a transmitted signal from a base station (BS). The cellular transceiver can include 1) a windup detector that can detect a low windup condition and 2) a receiver selector that can modify a number of active diversity branch receivers when the low windup condition is detected.

31 Claims, 7 Drawing Sheets

DYNAMICALLY RECONFIGURABLE RECEIVER

INCORPORATION BY REFERENCE

This application claims the benefit of U.S. Provisional Application No. 60/893,799, "Dynamic RxDiv" filed on Mar. 8, 2007, and U.S. Provisional Application No. 60/914,516, "UE with Dynamic Reconfiguration Receiver" filed on Apr. 27, 2007, including all cited references which are incorporated herein by reference in their entirety.

BACKGROUND

Cellular communications between a base station (BS) and a user equipment (UE) can become degraded by path loss, noise and interference, for example. The communication from the BS to the UE can be referred to as a downlink. The communication from the UE to the BS can be referred to as an uplink.

Diversity receivers (RXDIVs) in a user equipment (UE) can include multiple diversity branch receivers (DBRs). RXDIVs can increase the performance of cellular communications on radio frequency (RF) channels. The types of UE that can benefit from a RXDIV include cellular transceivers, mobile handsets, mobile terminals, radio modems, cellular data cards, and the like. However, a RXDIV can raise the power consumption of a UE and can reduce active or talk time. Careful management of UE resources, such as DBRs, can reduce the amount of power a UE consumes in certain operating modes, such as dedicated channel modes and high-speed packet access modes, for example. Careful management of UE resources can increase a UE's available talk time while not adversely affecting network performance.

SUMMARY

Aspects of the disclosure describe a cellular transceiver that can include multiple diversity branch receivers that receive a transmitted signal from a base station (BS). The cellular transceiver can include 1) a windup detector that can detect a low windup condition and 2) a receiver selector that can modify a number of active diversity branch receivers when the low windup condition is detected.

A cellular transceiver can include multiple radio frequency receivers that receive a transmitted signal from a BS, a channel quality module that provides an indication of a reception condition of a channel, and a receiver selector that modifies the number of active receivers in response to an indication of the resources required by a cellular service and whether data is to be sent to the cellular transceiver.

The present disclosure also describes a cellular communications system that can include a BS that transmits a signal and multiple remote receivers. Each remote receiver can include multiple radio frequency receivers that receive the transmitted signal, a mode detector that detects a shared data channel mode of operation, a signal quality detector that measures a signal performance metric of the transmitted signal, and a receiver selector that modifies the number of active receivers based on a low-priority-detected signal at the BS. In the absence of a low-priority-detected signal, the BS can request to decrease the number of active receivers when the signal performance metric exceeds a first target performance metric and can request to increase the number of active receivers when a second target performance metric exceeds the signal performance metric.

A cellular transceiver can include 1) radio frequency receivers that can selectively receive a diversity signal from a BS, 2) a transceiver controller that can operate in a shared data channel mode, and 3) a switch that can enable a radio frequency receiver based on a receiver selection signal sent by the BS. The transceiver controller can periodically transmit a channel quality indication to the BS.

The present disclosure also describes a method of controlling a cellular diversity receiver that can include receiving a transmitted signal via multiple diversity branch receivers in a remote receiver, detecting a low windup condition between the remote receiver and a BS based on the transmitted signal, and disabling a diversity branch receiver when 1) the low windup condition is detected and 2) a remote receiver performance metric exceeds a target performance level.

The present disclosure describes a method of controlling a cellular communication system that includes enabling multiple diversity branch receivers in a remote receiver, sending a modulation-coding scheme from the BS to the remote receiver, and disabling a diversity branch receiver when a measured or inferred channel quality indication exceeds a target channel quality indication.

The present disclosure describes a method of controlling a cellular diversity receiver in high speed packet access mode that includes enabling multiple diversity branch receivers in a remote receiver and disabling a diversity branch receiver when the remote receiver determines that a forecasted downlink data rate is less than a threshold data rate.

The present disclosure describes a cellular transceiver that includes multiple diversity branch receivers that receive a base station signal, a receiver selector that can increase the number of active diversity branch receivers, and a signal quality detector that can measure a signal quality performance metric based on signal to interference ration, a channel quality indication, a block error rate, or a bit error rate. The receiver selector can adjust the number of active diversity branch receivers when 1) at least one diversity branch receiver is inactive and 2) a signal quality performance metric of the base station signal falls below a threshold performance metric.

BRIEF DESCRIPTION OF THE DRAWINGS

The disclosure will make reference to the accompanying figures, wherein like numerals represent like elements, and wherein.

DETAILED DESCRIPTION OF EMBODIMENTS

Figure 1:
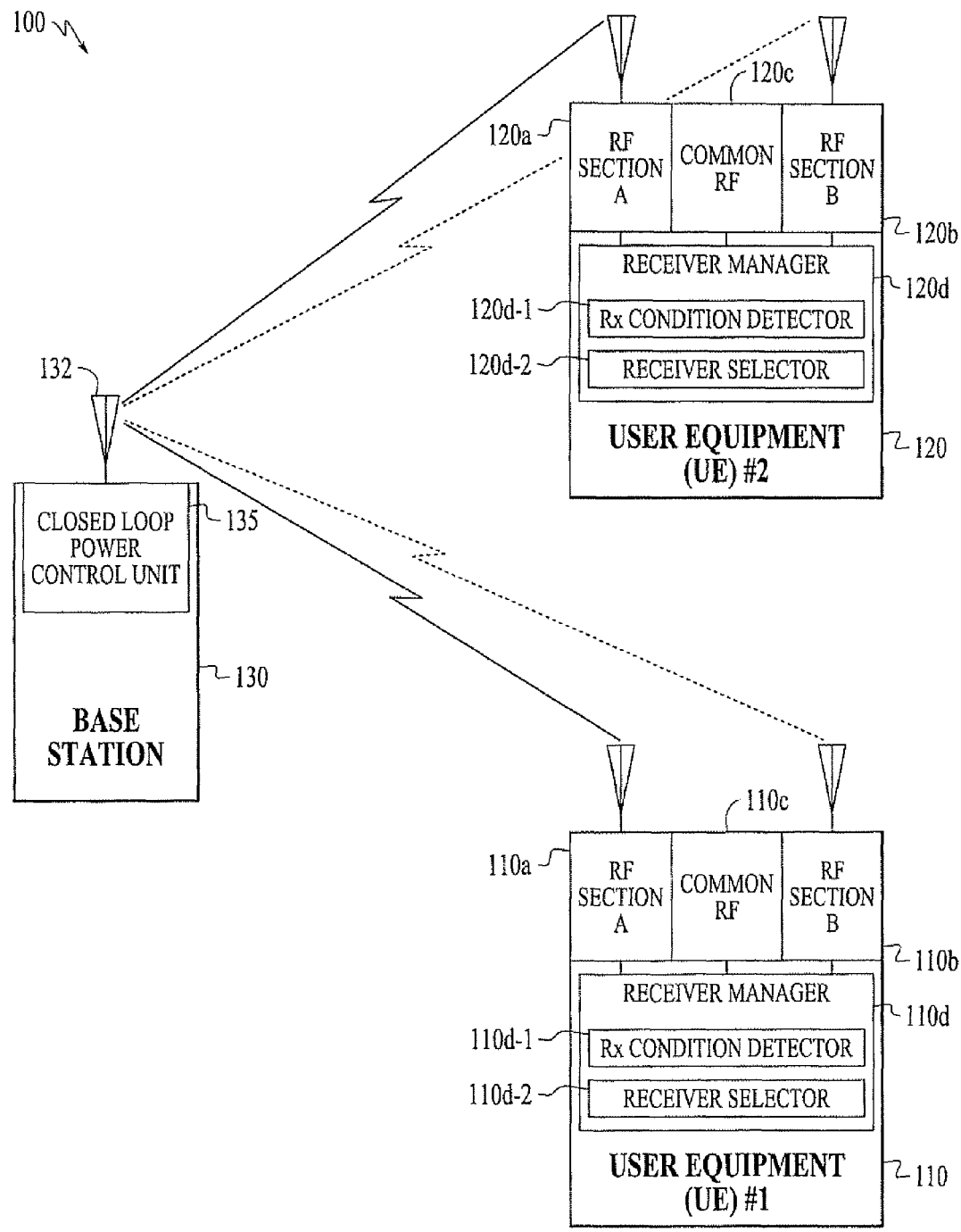
FIG. 1 shows a diagram of an example diversity-agile user equipment that includes a diversity-agile first and second user equipment (UE) and a base station (BS)

Diversity receivers (RXDIVs) can use spatial diversity and other techniques to enhance the reliability and data throughput rate of communications from a base station (BS). A RXDIV is a type of enhanced receiver that uses spatial diversity and can receive replicas of a downlinked RF signal that are transmitted from a BS. A RXDIV can use diversity branch receivers (DBRs) which can include the following elements: an antenna, a filter, a downconverter, including a mixer and a local oscillator that demodulates the downlink, an amplifier, a data converter, and other receiver elements, for example. A diversity-agile UE can adjust the number of DBRs.

The DBRs may generate baseband signals that can be combined to improve downlink signal quality, improve the reliability of data detection, and the spectral efficiency and overall reliability of a cellular network. The diversity branch signals can be combined in a RAKE combiner, a maximal ratio combiner, a minimum mean square error (MMSE) estimator, a maximum likelihood sequence estimator (MLSE), and the like within a RXDIV in a UE.

The DBRs can be switched ON and OFF or enabled or disabled, respectively, to reconfigure a RXDIV. The methods and devices of the present disclosure that enable and disable DBRs can affect trade-offs between the transmitted power from the BS and the power consumption from a UE's batteries. Reduced UE power consumption can increase both the active or talk time and the standby time of a battery-powered UE.

A UE that uses spatial diversity reception may switch one or more, but not all, DBRs OFF to save power. The active or talk time of a battery powered UE may increase due to the power savings. UE may switch OFF a DBR without degrading network performance when operating in the MBMS mode of the third generation partnership program (3GPP), for example. Other 3GPP modes, such as DCH, HSDPA and E-DCH modes may have difficulty in adjusting the number of active DBRs without degrading network performance, unless certain exception conditions occur as described below.

In the absence of the exceptions, when a UE operates in a Dedicated Channels mode, such as 3GPP DCH mode, a closed loop power control unit in the BS can automatically adjust the downlink transmitted power in response to variations in the downlink reception quality measured at the UE. The power control unit can readily reduce the transmitted power to a UE in DCH mode when the UE or BS does not adjust the number of active DBRs. The BS can use the power saved to accommodate more users in the cell, extend the cell coverage or to increase the rate of data transmission of the on-going calls, and the like. In other words, the existing power control loop may favor using all DBRs of the UE, rather than adjusting the number of DBRs.

In the absence of the exceptions, when a UE operates in the high speed data packet access (HSDPA) mode, the BS may use a power control unit to facilitate bursty, high data rate downlink transmissions. For example, the BS can maintain a constant transmitter power and take advantage of good transmission conditions or favorable fluctuations in the channel to send data at times that allow a higher data rate.

In the absence of the exceptions, when a UE operates in the 3GPP enhanced DCH mode (E-DCH), E-RGCH, A-RGCH and E-HICH channels are transmitted to the UE. The E-RGCH, A-RGCH and E-HICH channels are used to control uplink communications from a UE. The E-RGCH, A-RGCH and E-HICH channels allow for scheduling and acknowledge/not acknowledge (ACK/NACK) transmission in the uplink. The network can increase the coverage of the E-RGCH, A-RGCH and E-HICH channels by adjusting the downlink transmit power according to the received downlink quality. The cellular network may accommodate uplinks from more UEs when the UEs keep all DBRs active.

A UE operating in a 3GPP DCH, HSDPA, or E-DCH modes can reduce the number of active DBRs when one or more of the following exceptions occur:

1) the downlink signal quality indicates the UE could maintain reliable communications with the BS despite using a reduced number of active DBRs (the signal-quality based DBR selection rule may include multiple thresholds that introduce hysteresis into the DBR switching decision);
2) the BS is in a low windup condition with respect to the UE, the low windup condition may be detected by measuring signal quality, such as signal-to-interference ratio (SIR);
3) exceptions 1) and 2) may be combined or applied sequentially and the block error rate (DCH mode) or bit error rate (for fractional DCH or FDCH mode) may be used as an additional test for decrementing the number of active DBRs;
4) for HSDPA mode, if the UE determines the UE only requires low BS resources, either by
   a) higher layers signalling from the application level, for example, or by
   b) direct command from the network,
   then the UE may measure downlink signal quality, such as channel quality indication (CQI), and the UE can make an autonomous decision to reduce the number of active DBRs, and
5) for HSDPA mode, if the BS determines the UE only requires low BS resources, then the BS can signal the UE to reduce the number of active DBRs.

With respect to exception 5), the BS may switch multiple DBRs back on when a) the BS has data to transmit to the UE and b) the signal quality at the UE would be too low for reliable communications with a reduced number of active DBRs. The BS may determine if the signal quality would be too low by, for example, comparing the CQI measured at a UE to a target CQI determined from an SIR requirement established by a given level of service from the BS. If the CQI is less than the level of service required, then the BS can enable or activate an additional DBR. The BS can save UE power when the BS tests and manages the count of active DBRs because the BS can synchronize the number of active DBRs to downlink transmission windows. In other words, the BS can pre-determine appropriate time windows for downlinks and can send preparatory downlink DBR control signals to the UE.

The 3GPP HSDPA mode can reduce the latency and round trip time for some cellular network applications. The cellular network performance that can be obtained in the HSDPA mode can be quite dependent on both the propagation characteristics of the RF channel or channels and the dynamics of the method used to control transmitter RF power. The UE may measure the quality of the RF channel or channels using a CQI or other downlink signal quality metrics, such as SIR.

The 3GPP standards are standards for wideband code-division-multiple access (WCDMA) signals. Of course, it should be understood that the methods and devices of this disclosure can also be readily applied to other communications standards and signal types, such as WLAN, GSM, WiMax, OFDM, CPM, CTE, and the like.

The 3GPP standards allow for closed loop control of the radiated transmitter RF power. An RF power control loop can be implemented by uplinking an indication of the received signal, such as downlink received power control (DLPC), SIR, CQI, or other downlink signal quality performance metrics, to the BS. The BS can respond by adjusting the radiated transmitter RF power using a power control unit (PCU).

The PCU can increase or decrease the radiated transmitter RF power over a transmitter dynamic range (TXDR) of, for example, 25 to 30 dB. The PCU may be unable to decrease the radiated transmitter RF power below a minimum set by the maximum BS transmitter power minus the TXDR. The BS may then be said to be in a low windup condition with respect to a given UE. A low windup condition and high windup condition can refer to conditions in which the BS reaches a minimum or maximum transmitter power limit, respectively.

The PCU can adjust the radiated transmitter power level to a lower limit; the resulting state can be called a low windup condition. The UE can detect both 1) the low windup condition and 2) the downlink signal quality. The downlink signal quality may be higher than a required or target downlink signal quality when the BS is in a low windup condition. The UE may use a variety of methods to detect the low windup condition. For example, the UE may use SIR thresholding, analyze the distribution of up and down transmit power control (TPC) requests sent from the UE to the BS, and the like.

FIG. 1 shows a diagram of an example diversity-agile user equipment 100 that includes a diversity-agile first and second UE, denoted UE 110 and UE 120, respectively, and a base station (BS), denoted BS 130. The UE 110 can include a first RF receiver 100a, a second RF receiver 110b, common RF elements 110c, and a receiver manager 110d. The receiver manager can include a receiver condition detector 110d-1 and a receiver selector 110d-2. The first and the second RF receivers 110a and 110b can each include an RF antenna and antenna-specific RF receiving circuits, such as filters, down-converters, mixers, amplifiers, detector, discriminators, and demodulators. The first and second RF receiving 110a and 110b may be described as DBRs. The common RF elements 110c can include RF, intermediate frequency (IF) and baseband elements such as local oscillators, analog to digital (A/D) converters, phase locked loops, tuning circuits, analog and digital signal processors, and other receiving elements. For example, the common RF elements 110c may include a local oscillator. The common RF elements 110c may be coupled to the first RF receiver 110a, the second RF receiver 110b, and the receiver manager 110d.

The UE 120, may contain a first and a second RF receiver, denoted 120a and 120b, respectively, common RF elements 120c, and a receiver manager 120d. The structure, interconnections, and functions of UE 120 elements represent corresponding features of UE 110 in a physically separate UE.

The BS 130 can include a closed loop power control unit (PCU) 135 and an antenna 132. The antenna 132 can be a single antenna as shown, or may be a suitable antenna array, a segmented antenna, a single broadband antenna, and the like. The signals from antenna 132 can propagate to one or more UE as a radiated transmitter signal. The radiated transmitter signal can couple to UE 110 and UE 120 as shown in FIG. 1.

UE 110 and UE 120 may be spaced at different distances from the BS 130 and can encounter different path losses. The path losses may vary with changes in RF propagation conditions. The propagation condition changes that can affect the path losses include distance between the UEs and the BS, rain, solar activity, man-made or natural obstructions, and the like.

The UE 120 may be spaced at a substantial distance from the BS 130 and may be subject to a range of path losses from 30 to 100 dB and maybe 70 to 80 dB typically. The range of path losses encountered may be called the dynamic range. In some circumstances, such as when UE 110 is very near the BS 130, the path loss of the UE 110 can be so small that the UE 110 has a consistently high signal quality or performance metric. Signal quality metrics can include measurements or estimates of 1) signal to noise ratio (SNR), 2) SIR, 3) transport block error rate (BLER), 4) bit error rate (BER), 5) CQI, and the like. The signal quality or performance metric or metrics can be measured by each UE, such as UE 110 or 120 for the signals it receives. The UE 110 or 120 can measure the signal quality for each diversity channel. The signal quality of each diversity channel can be measured and ascribed a performance metric even while other RXDIVs are enabled.

The BS 130 may control the radiated transmitter RF power or downlink power via a downlink power control signal. The BS 130 can adjust the downlink power using the PCU 135 that can respond to the signal quality measurement that is fed back from the UE 110 or 120 or both. When the UE 110 has a high signal quality, UE 110 may request the BS 130 to reduce the transmitter power by signaling transmit power control (TPC) requests. The BS 130 may be unable to reduce its transmit power below a given level due to design or operational limitations. Typically, BS 130 can reduce the transmitter power by 25 to 30 dB below the maximum transmitter power. A condition in which the BS 130's transmitter power cannot be reduced below a lower bound despite the request of a UE, such as UE 110 or UE 120, to do so can be described as a low windup condition between the BS and the UE issuing a power reduction signal or request to the BS.

A received power difference may exist between the power level received at a UE, such as UE 110, near the BS 130 when the BS operates at the minimum transmit power and the power received at a distant UE, such as UE 120, when the BS 130 operates at maximum transmit power. It may be noted that the power at a UE can be a function of path loss. The path loss can be a function of the distance between the UE and the BS. The power transmitted to a given UE can be controlled and a difference in received power between a pair of UEs may occur due to a difference in path losses. For example, if the maximum transmit power is considered to be a 0 dB reference, then a received power level difference of 50 dB may occur. The 50 dB received power level difference can allow a variety of diversity control solutions.

Figure 2:
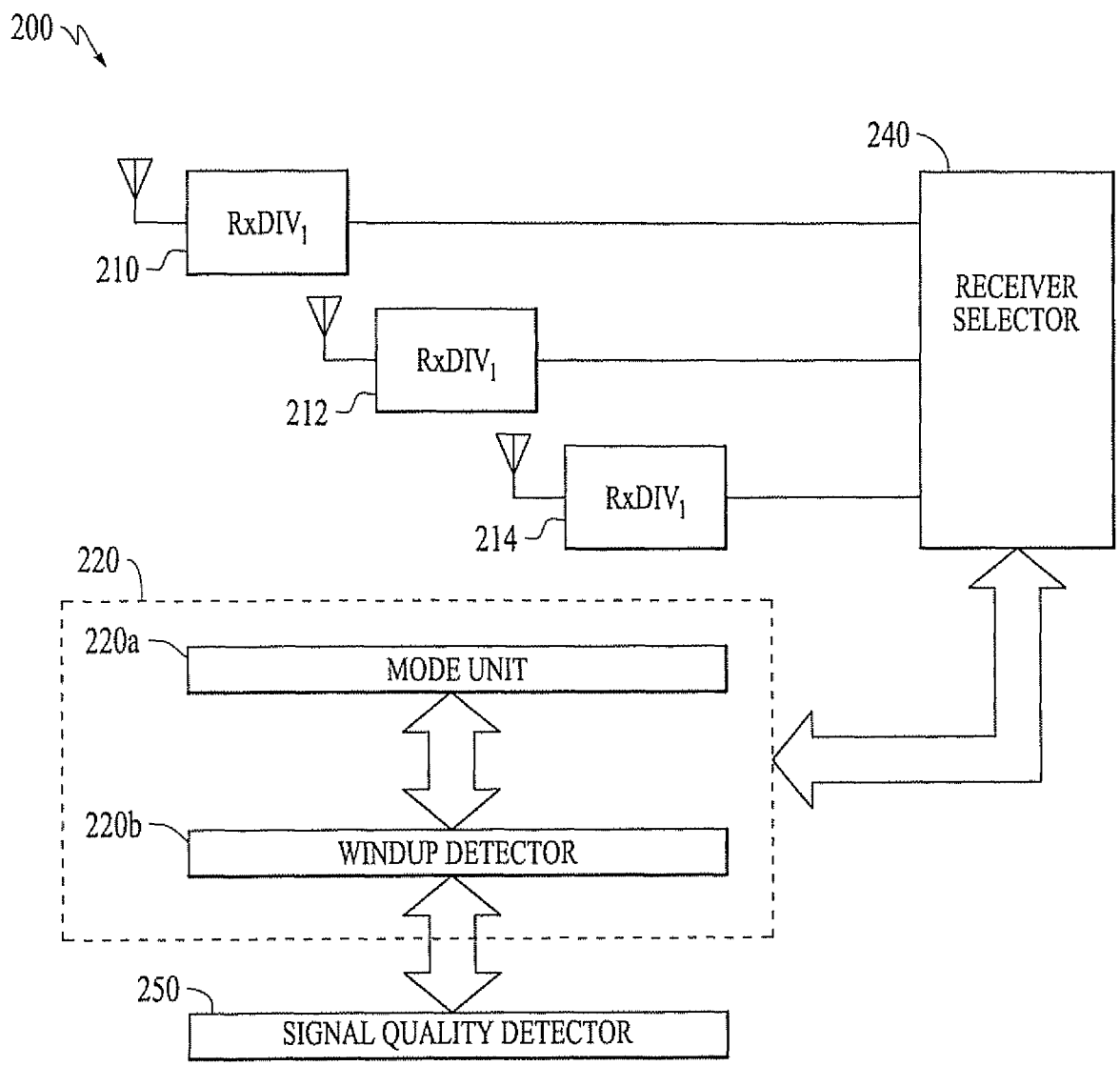
FIG. 2 is an example of a diversity-agile UE.

FIG. 2 is an example of a diversity-agile UE 200 that includes a set of DBRs, DBR 210, DBR 212, and DBR 214, a mode detector 220, a receiver selector 240, and a signal quality detector 250. The dynamically reconfigurable receiver 200 may be included in a UE in a cellular communications system that includes a BS. The DBR 210-214 can be coupled to the mode detector 220, the mode detector 220 can be coupled to the receiver selector 240 and the signal quality detector 250, and the receiver selector 240 can be coupled to the DBR 210-214.

The DBRs 210-214 can each receive a diversity branch signal within a radiated transmitter signal from a BS. Each DBR 210-214 can include receiver circuits, including a filter that can select a radio frequency signal component in the radiated transmitter signal, and a down-converter that down-converts the selected radio frequency signal to a real or complex baseband signal. The DBR receivers 210-214 may transfer downconverted signals to a common or shared detector in the receiver selector 240 or the DBR receivers 210-214 may include individual detectors. The detector or detectors can reconstruct a data stream from the downconverted signal.

The mode detector 220 can receive the baseband signals from the DBR 210-214 that are enabled by receiver selector 240. The receiver selector 240 can enable or disable a DBR 210-214 by removing power, switching a signal path OFF, commanding that a DBR 210-214 to enter a standby mode, and the like provided that at least one DBR remains active.

The mode detector 220 can 1) combine diversity branch signals from DBR 210-214, 2) determine if the BS is in a low windup condition with respect to the UE, and 3) use the individual or combined diversity branch signals to determine if the radiated transmitter signal indicates that the BS to UE transmission uses a dedicated channel mode. The determination of the mode may typically occur at the beginning of a transmission or call. The mode may or may not change during a call. The dedicated channel mode can include the 3GPP DCH, FDCH modes, and the like.

The mode detector 220 can accept baseband signals from the DBR 210-214 receivers and can implement a RAKE receiver, a maximal ratio combiner, a MMSE, a MLSE, and like processors. The mode detector 220 can include a mode unit 220a that determines a communications mode, such as a dedicated or shared channel mode. For example, the mode unit 220a can determine if a transmitted signal is a DCH or high speed data packed access (HSDPA) signal. When an HSDPA signal is detected, then both a shared data channel as well as a dedicated or fractionally dedicated channel, e.g. DCH or FDCH, can be open.

The mode detector 220 can also include a windup detector 220b that can determine when a low windup condition occurs. The windup detector 220b may be inactive when the mode unit 220a determines that the BS and UE communicate in a shared data channel mode, for example. The windup detector 220b may be active when the mode unit 220a determines that the BS and user equipment communicate in dedicated channel mode. The mode unit 220a may be active when 1) only DCH mode is present or 2) when either a HSDPA or DCH mode is present.

The windup detector 220b of the mode detector 220 can determine if a low windup condition exists between the BS and user equipment by estimating SIRs, evaluating up/down power control loop requests and asymmetries thereof, and the like. For example, the SIRs can be obtained from a RAKE technique.

The signal quality detector 250 can measure a signal quality such as SNR, SIR, CQI and the like. The signal quality detector 250 can generate a performance metric from any of the signal quality measurements. The signal quality detector 250 can apply one or more linear or nonlinear filters to the signal quality measurements and the performance metric. The filters can condition the signal quality measurements and performance metric so that RXDIV controls, such as the control and selection lines of the receiver selector 240 reliably configure or reconfigure the dynamically reconfigurable receiver 200. In other words, either linear or nonlinear filters may be used to reduce the probability of false decisions in selecting DBRs.

Figure 3:
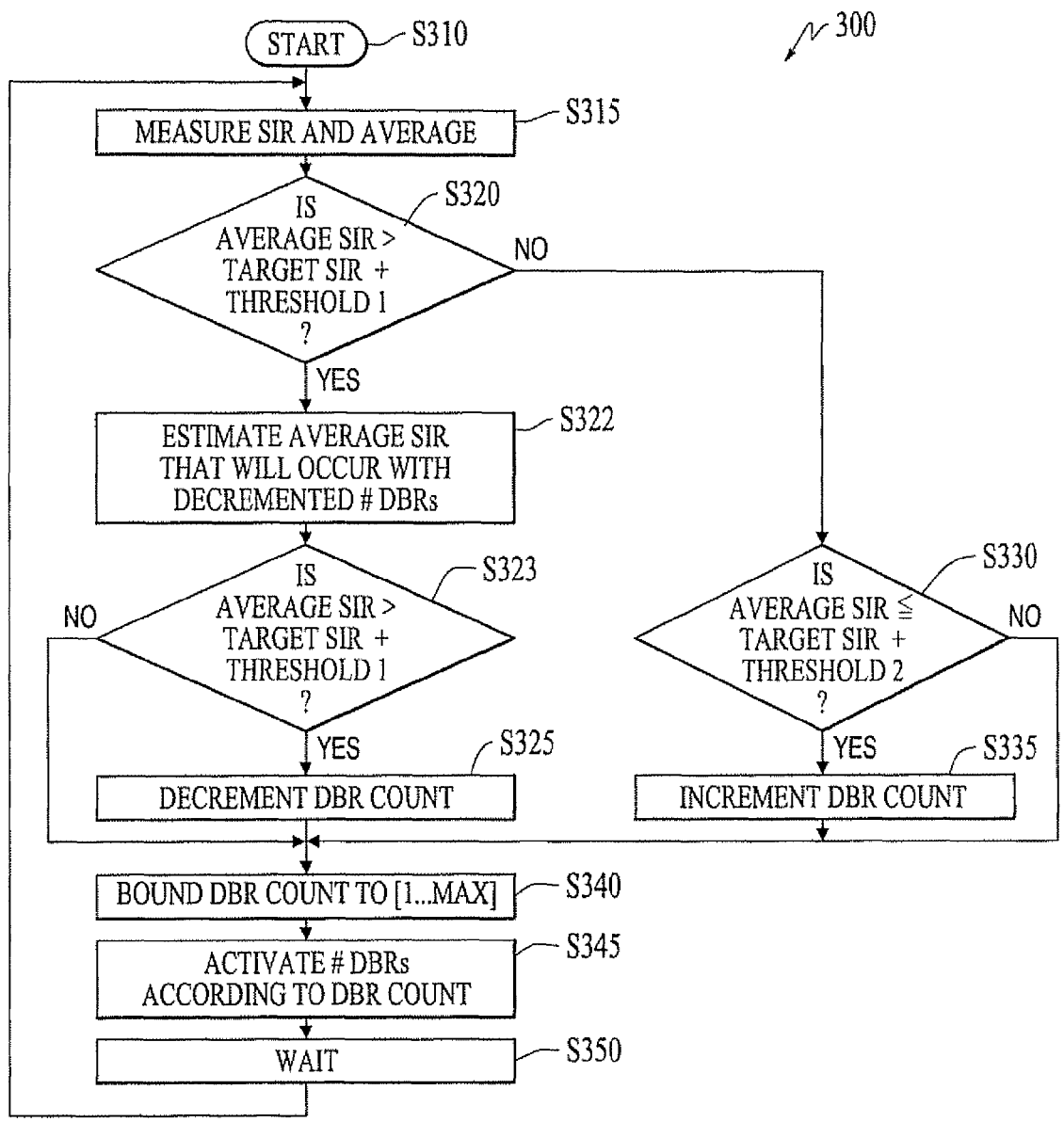
FIG. 3 shows a diagram of an example flowchart for adjusting the number of diversity branch receivers (DBRs) in a UE operating in a dedicated channels mode.

FIG. 3 shows a diagram of an example flowchart 300 for adjusting the number of DBRs in a UE operating in a dedicated channels mode, such as DCH or FDCH. Program flow can start at program step S310 and can proceed to program step S315 in which the SIR can be measured at a UE and averaged. From program step S315, program flow can proceed to program step S320 in which the UE can compare the average SIR to a target SIR plus a first threshold. If the average SIR is greater than the target threshold plus the first threshold then program flow can proceed to program step S322, otherwise program flow can proceed to step S330.

In program step S322, the program can estimate the average SIR that is likely to occur when the UE operates with fewer DBRs. For example, the SIR estimate can be calculated from the present or current downlink signal. From program step S322, the program flow can proceed to step S323 in which the average estimated SIR, based on fewer active DBRs can be tested or compared with the sum of the target SIR and the first threshold. If the estimated SIR is greater than the sum, then program flow can proceed from step S323 to step S325, otherwise program flow can proceed to step 340.

When the program reaches step S325, the program can decrement a DBR count. The DBR count can be a variable that can determine the number of DBRs that may be activated. If program step S320 determines that the average SIR is less than or equal to the target SIR plus the first threshold, the program flow can proceed to program step S330.

In step S330, the program can test whether the measured and averaged SIR is less than or equal to the target SIR plus a second threshold. If the comparison is affirmative, then program flow can proceed to program step S335 in which the DBR count can be incremented, otherwise, program flow can proceed to program step S340.

From program step S335, the program flow can proceed to program step S340 in which the DBR count can be bounded or constrained to a range of DBRs. It may be noted that program step S340 may constrain or bound the DBR count to a value between one and a maximum number of DBRs in a UE. For example, in a dual-diversity receiver, the DBR count can be constrained to a range one and two, inclusive.

From program step S340, the program can flow to program step S345. In program step S345, the program can activate the number of DBRs according to the bounded DBR count. Program step S345 may switch on or switch off DBRs so that at least one DBR operates, but no more than the maximum number of DBRs in a UE. From program step S345, program flow can proceed to program step S350 where program execution can wait or pause before returning to step S315.

It may be note that the first threshold 1 can be set so that the UE avoids switching off a DBR erroneously or prematurely and may thus avoid frequent transitions in the number of active DBRs. The second threshold, which may be smaller than the first threshold, can be set so that the UE does not cause the BS to boost power erroneously. In other words, this second threshold can be set so that the UE can switch to multiple DBRs so that the BS is not required to boost transmitter power relative to the BS transmit power required if only a single DBR was activated.

It may also be noted that steps S322 and S323 may be optional. Steps S322 and S323 may improve the reliability of switching DBRs ON and OFF so that frequent or poorly timed changes in the number of active DBRs can be avoided. It may be noted that the reception or signal quality at a given DBR at a particular time may differ from other DBRs in a UE. The UE may turn off a DBR or DBRs that have relatively worse reception.

Figure 4:
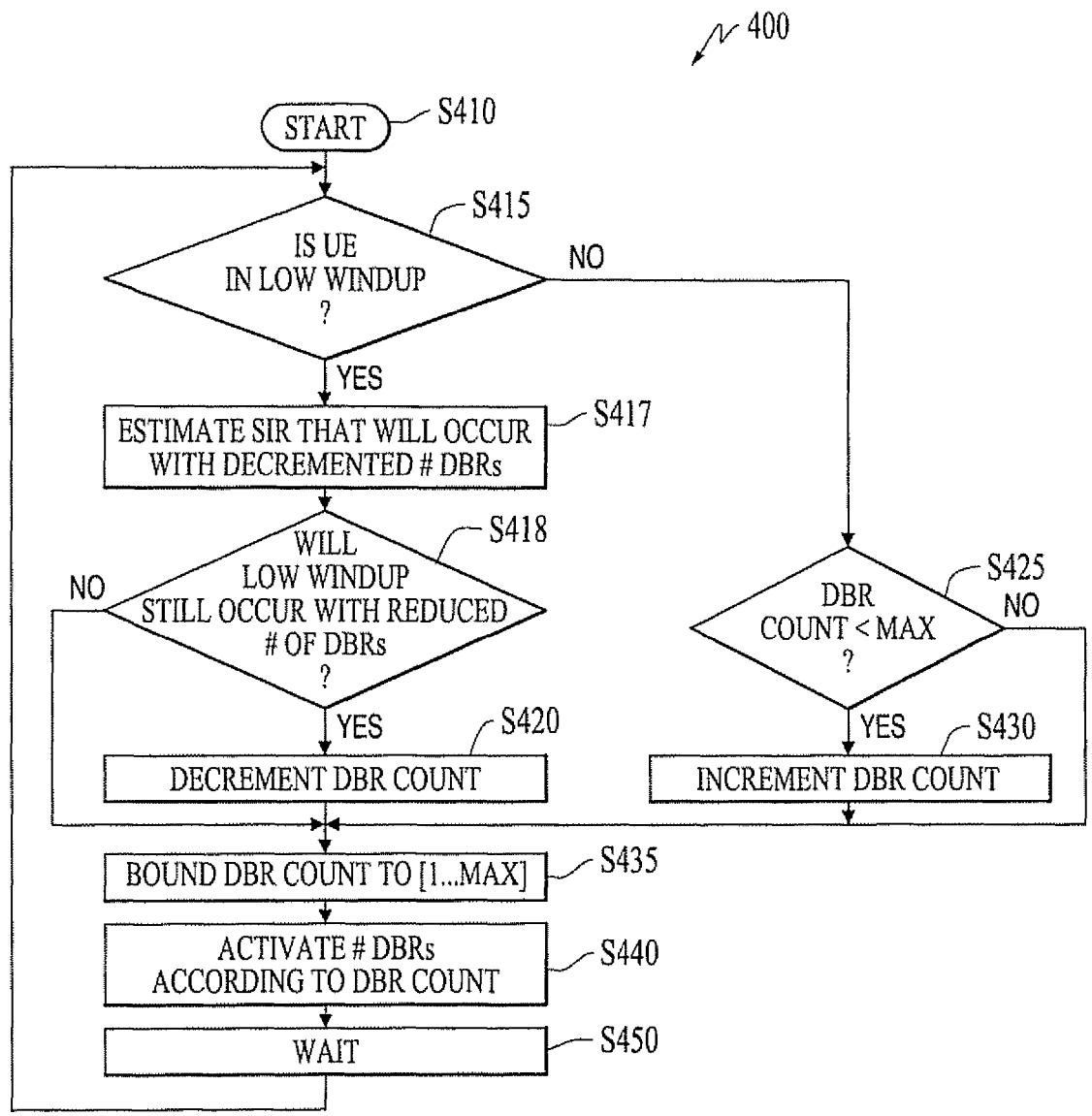
FIG. 4 is a diagram of an example of a flowchart for adjusting the number of DBRs used in a UE in a dedicated channels mode.

FIG. 4 is a diagram of an example of a flowchart 400 for adjusting the number of DBRs used in a UE in a dedicated channels mode. Program flow can start at program step S410 and can proceed to program step S415 where the program can determine whether a low windup condition exists between the BS and a UE. If a low windup condition exists, then program flow can proceed to program step S417 in which the UE can estimate the SIR that will likely occur when the number of DBRs is decreased, otherwise program flow can proceed to program step S425. It may be noted that in program step S415, a low windup condition may be detected by comparing an estimated SIR to a target SIR, by examining a distribution of up and down power control requests from the BS sent by the UE, and like methods.

From program step S417, program flow can proceed to program step S418 in which the UE can determine if the low windup condition will persist with a reduced number of DBRs. The test of program step S418 maybe based on the SIR estimate of S418. In other words, the estimated SIR may be used to determine if the UE is likely to remain in a low windup state. If the test of program step S418 is affirmative then the program can proceed to step S420, otherwise program flow can proceed to step S425.

When program flow arrives at program step S420, the program can decrement a count of DBRs. The DBR count can determine the number of DBRs that will be activated in a RXDIV.

When program flow arrives at program step S425, the program can compare the DBR count to a maximum count. In other words, the program can test whether the UE is operating with fewer than the maximum number of DBRs. If so, then program flow can proceed to program step S430 in which the DBR count can be incremented, otherwise program flow can proceed to step S435.

It may be noted that program flow from program steps S418, S420, S425 or S430 can merge so program flow proceeds to program step S435. Program step S435 can check that the DBR count is bounded between one and the maximum number of DBRs. For example, the maximum number of the DBRs may be two in a dual diversity based receiver. In such a case, the number of requested receivers can be bounded between one and two. From program step S435, program flow can proceed to program step S440 in which the UE can decide which DBR to switch off. For example, UE can activate a single receiver or a dual receiver. It may be noted that the reception or signal quality at a given DBR at a particular time may differ from other DBRs in a UE. The UE may turn off a DBR or DBRs that have relatively worse reception. From program step S440, program flow can proceed to program step S450 in which program execution can wait before returning to step S415.

Figure 5:
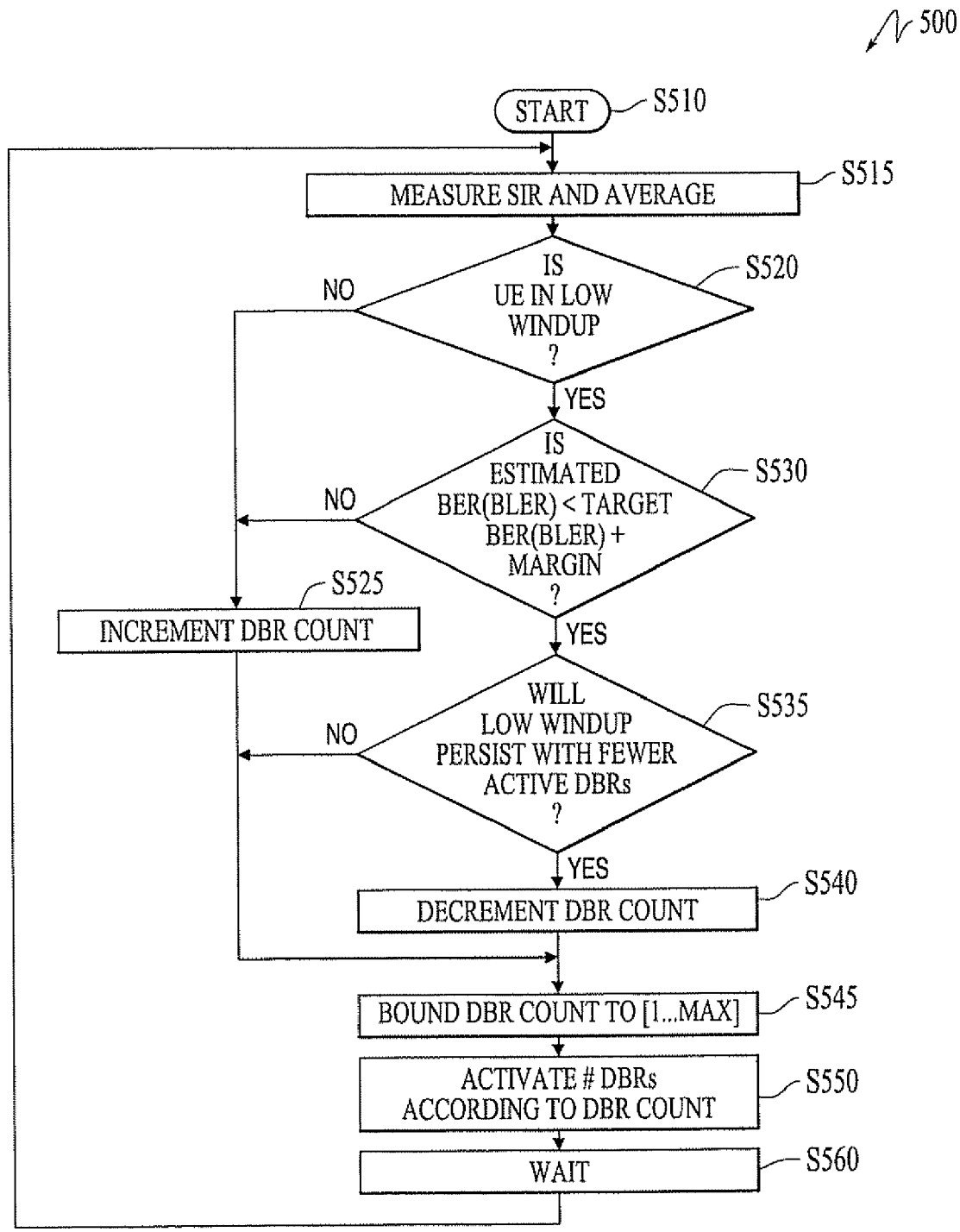
FIG. 5 shows a diagram of an example of a flowchart for adjusting the number of DBRs in a UE operating in a dedicated channels mode.

FIG. 5 shows a diagram of an example of a flowchart 500 for adjusting the number of DBRs in a UE operating in a DCH or FDCH mode.

Program execution can begin at program step S510 and can proceed to program step S515 in which the SIR of a downlink signal can be measured and averaged. From programs step S515, program flow can proceed to program step S520 in which a low windup condition between the BS and UE can be detected. If a low windup condition exists, then program flow can proceed to program step S530, otherwise program flow can proceed program step S525.

Once program step S520 determines that program flow should proceed to program step S525 and the number of DBRs maybe modified, then program step S525 may increment a DBR count. The DBR count may be subsequently bounded between one and the maximum number DBRs in a UE so that at least one DBR is always operating.

In program step S530, the program may compare a BLER or BER estimate with a target BLER or BER. The target BLER may be augmented by a margin that prevents erroneous switching decisions in the number of DBRs.

In program step S530, the UE may use BLER estimates and a BLER target plus margin as a logical test for channels operating in a DCH mode. Program step S530 may compare estimated bit error ratios (BER) and target BER plus margin when the UE operates in FDCH mode. When program step S530 determines the estimated BER or BLER is smaller than a target BER or BLER plus margin, then program flow can proceed to program step S535, otherwise program flow can proceed to program step S525.

In program step 535, the program can determine if a low windup condition will persist if fewer active DBRs operate. If so, program flow can proceed to program step S540 otherwise, the program flow can proceed to step S545. In program step S540, a count of DBRs may be decremented. For example, if two DBRs are indicated by DBR count then program step S540 may decrement that count to a single DBR.

Program steps S525 and S540 can both flow to program step 545. In addition, a negative test condition of program step S535 can cause the program to flow to step S545. In program step S545, the DBR count variable may be bounded to between one and the maximum number of DBRs in a UE. The maximum number of UEs may be, for example, two in a dual diversity receiver. From program step S545, program flow can proceed to program step S550 in which the UE can activate or switch on the number of DBRs indicated by the DBR count. For example, the UE may switch on one or two diversity branch receivers as indicated by a DBR count variable. For program step S550, program flow can proceed to program step S560 in which program execution can wait before returning to step S515.

Figure 6:
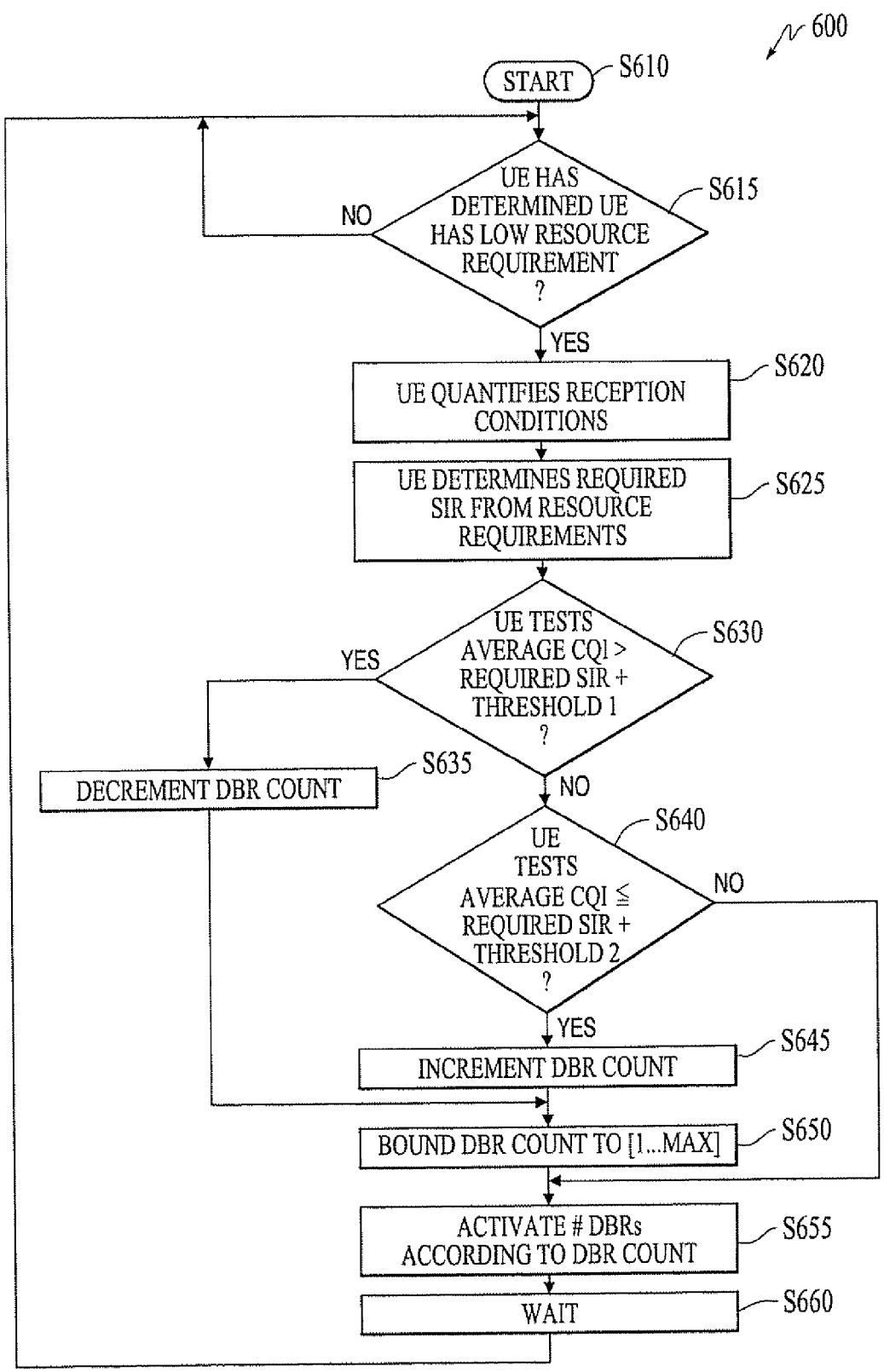
FIG. 6 shows a diagram of an example of a flowchart in which a UE in a shared channels mode can control the number of DBRs.

FIG. 6 shows a diagram of an example of a flowchart 600 in which a UE in a shared channels mode can control the number of DBRs. It may be noted that, for HSDPA, management and control of DBR selection may be performed at the UE. In such cases, the BS can send information about a desired signal quality and an actual signal quality. The actual signal quality may be derived from knowledge of the modulation coding scheme (MCS). It may also be noted that, for HSDPA, the BS can manage and control the DBRs in a UE, as discussed with respect to FIG. 7.

Program flow can start at program step S610 and can proceed to program step S615 in which the UE may use a service that has low resource requirements for data from the BS. For example, the UE may determine that it needs a small number of channelization codes and may use a low data rate modulation and coding scheme (MCS). A CQI threshold that is known or sent to the UE by the BS may be compared with an inferred CQI at the UE. The low resource requirement may be indicated by a low-priority detected condition at the BS. The low resource requirement may be determined by 1) knowing the maximum MCS and comparing the maximum to the CQI or 2) when the BS communicates that a low resource condition applies, as discussed with respect to FIG. 7. For example, low resource requirements or a low-priority detected condition can occur when a UE does not require data for an upcoming data window, such as a 20 millisecond window used for Voice over Internet Protocol (VoIP) communications from the BS.

From program step S615, program flow can continue to program step S620 in which the UE can obtain a reception condition quantifier, such as an inferred CQI. For example, UE may infer the CQI appropriate to a given MCS. From program step S620, program flow can continue to program step S625 in which the UE can determine what reception quality it requires for a given level of service. For example, the reception quality that may be required for a given level of service may be determined by measuring the SIR. From program step S625, program flow can continue to program step S630 in which the UE can test whether the average CQI is greater than the required signal to interference ratio (SIR) plus a first threshold, if so, program flow can proceed to program step S635, otherwise program flow can continue to program step S640.

When program flow arrives at program step S635, the program can decrement a DBR count. From program step S635 program flow can continue to program step S650 in which an adjusted DBR count may be bounded to an integer between one and the maximum number of DBRs in a UE. For example, if program step S635 decrements DBR count to 0, program step S650 may restore the DBR count to 1 so that at least one DBR is operating at all times.

From program step S650, program flow can continue to program step S655 in which the program can activate the number of DBRs according to the DBR count. For example, the DBR count may indicate that between 1 and the maximum number of DBRs in a UE may be activated. It may be noted that the reception or signal quality at a given DBR at a particular time may differ from other DBRs in a UE. The UE may turn off a DBR or DBRs that have relatively worse reception.

When program flow proceeds from program step S630 to program step S640, the UE can test whether or not the average CQI is less than or equal to the required SIR plus a second threshold, if so, program flow can proceed to program step S645, otherwise program flow can proceed to program step S655. The first threshold of program step S630 and the second threshold of program step S640 may establish hysteresis in the switching decision comparisons. For example, the first threshold may be greater than the second threshold so that program step S630 can implement a reliable test for potentially decreasing a DBR count. Program step S630 can implement a lower threshold test using so the DBR count may be incremented reliably.

Program flow can proceed from program step S640 to program step S655 when the comparison in program step S640 indicates that the average CQI is not less than or equal to the required SIR plus the second threshold.

When program flow arrives at program step S655, either from program step S640 or from program step S650, program step S655 can activate the number of DBRs according to the DBR count. From program step S655, program flow can proceed to program step S660 in which program execution can wait before returning to step S615.

Figure 7:
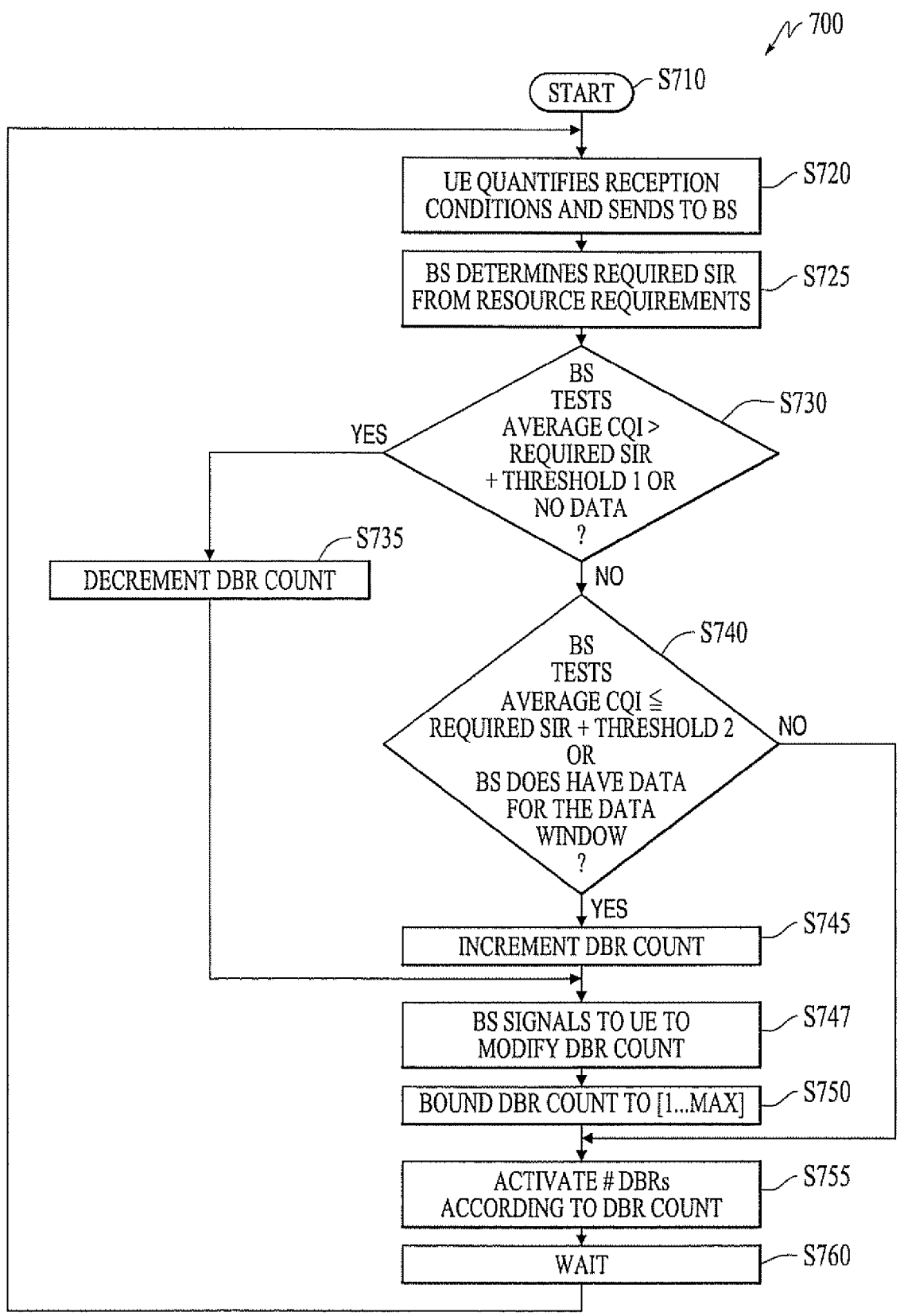
FIG. 7 shows a diagram of an example of a flowchart in which the number of DBRs of a UE in shared channels mode can be adjusted.

FIG. 7 shows a diagram of an example of a flowchart 700 in which the number of DBRs of a UE in HSDPA mode can be adjusted under the control of a BS and signaled to the UE. Program flow can start at program step S710 and can proceed to program step S720 in which a UE can measure a reception condition, for example, CQI, and can send the reception conditions to the BS. From program step S720, program flow can proceed to program step S725 in which the BS can determine the required SIR or signal to interference ratio from its resource requirements.

From program step S725, program flow can proceed to program step S730 in which the BS can test if the average CQI is greater than the required SIR plus a first threshold or if there is no data to be transmitted to the UE, if so, program flow can proceed to step S735, otherwise, program flow can proceed to program step S740. From program step S735, program flow can proceed to step S747.

When program flow proceeds from program step S730 to program step S740, the BS can test whether or not the average CQI is less than or equal to the required SIR plus a second threshold or, optionally, whether the BS does have data for the UE in an upcoming data window interval. If the test in program step S740 is affirmative, then program flow can proceed to program step S745 in which the DBR count can be incremented. From program step S745, program flow can proceed to program step S747 in which the BS can signal the UE to modify the DBR count.

From program S747, program flow can proceed to step S750 in which the bound on the DBR count can be enforced.

When the test in program step S740 is negative, the program flow can proceed to program step S755 which can activate the number of DBRs according to the DBR count.

From program step S755, program flow can proceed to program step S760 where program execution can wait before returning to step S720.

It may be noted that different channel modes, such as dedicated and shared channel modes, may have different signal quality requirements. In such cases, program flow that conforms to flowcharts 300-700 may cause a UE to operate using the largest number of DBRs needed to support any such mode.

While the invention has been described in conjunction with the specific exemplary embodiments thereof, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A cellular transceiver, comprising:
a plurality of diversity branch receivers configured to receive a transmitted signal from a base station;
a windup detector configured to detect a low windup condition of the base station and the cellular transceiver, the low windup condition indicating that the base station is unable to reduce a transmitter power of the base station for transmitting signals to the cellular transceiver; and
a receiver selector coupled to the windup detector, the receiver selector being configured to modify a number of active diversity branch receivers in response to a detected low windup condition of the base station and the cellular transceiver if more than one diversity branch receiver is active when the cellular transceiver is in a dedicated channel mode.

2. The cellular transceiver of claim 1, wherein, when receiver selector modifies the number of active diversity branch receivers, the receiver selector decreases the number of active diversity branch receivers.

3. The cellular transceiver of claim 1, wherein the receiver selector increases the number of active diversity branch receivers when the detected low windup condition does not occur and at least one diversity branch receiver is not active.

4. The cellular transceiver of claim 1, wherein the dedicated channel mode includes at least one of a 3GPP dedicated channel mode and a 3GPP fractional dedicated channel mode.

5. The cellular transceiver of claim 1, wherein the windup detector detects the low windup condition when the base station cannot reduce a transmitter power of the transmitted signal below a minimum transmitter power in response to a power reduction signal from the cellular transceiver.

6. The cellular transceiver of claim 1, further comprising a mode unit that is coupled to the plurality of diversity branch receivers, the mode unit being configured to detect a dedicated channel mode of operation between the base station and the cellular transceiver.

7. The cellular transceiver of claim 1, further comprising:
a signal quality detector, coupled to the windup detector, that is configured to measure a performance metric of at least one of the transmitted signal and a received signal using at least one of a signal to interference ratio, channel quality indication, block error rate, and bit error rate, and to compare the performance metric to a target performance metric to adjust the number of active diversity branch receivers.

8. The cellular transceiver of claim 7, wherein the receiver selector is further configured to increase the number of active diversity branch receivers when at least one of the diversity branch receivers are inactive.

9. The cellular transceiver of claim 8, wherein the cellular transceiver operates in one of a dedicated channels mode and a shared data channel mode.

10. The cellular transceiver of claim 1, wherein the windup detector detects the low windup condition using a history of power increment/decrement requests sent by the cellular transceiver.

11. The cellular transceiver of claim 1, wherein the receiver selector increases the number of active diversity branch receivers when the windup detector does not detect the low windup condition.

12. The cellular transceiver of claim 1, wherein each diversity branch receiver further comprises:
a filter configured to select a radio frequency signal component in the received signal; and
a down-converter coupled to the filter, the down-converter configured to downconvert the selected radio frequency signal.

13. The cellular transceiver of claim 1, wherein the receiver selector switches off a diversity branch receiver having a lowest signal quality.

14. A cellular transceiver, comprising:
a plurality of radio frequency receivers configured to receive a transmitted signal from a base station;
a channel quality module that is configured to provide a reception quality indication of a channel; and
a receiver selector, coupled to the channel quality module, the receiver selector being configured to modify a number of active radio frequency receivers in response to an indication of resources that are required by a cellular service and whether data is to be sent to the cellular transceiver and configured to increase the number of active receivers when the reception quality indication is less than a sum of a first target performance metric and a first threshold and decrease the number of active receivers when the reception quality indication is greater than a sum of a second target performance metric and a second threshold.

15. The cellular transceiver of claim 14, wherein the reception quality indication is at least one of a signal to interference ratio, channel quality indication, block error rate, and bit error rate.

16. The cellular transceiver of claim 14, further comprising a resource indication receiver, coupled to the channel quality module, that is configured to indicate a data resource requirement of the base station.

17. The cellular transceiver of claim 14, wherein the first target performance metric exceeds the second target performance metric.

18. The cellular transceiver of claim 14, wherein the first and second target performance metrics are based on a quality of service requirement.

19. The cellular transceiver of claim 14, wherein the receiver selector switches off a diversity branch receiver having a lowest signal quality.

20. A cellular communications system, comprising:
a base station configured to transmit a signal; and
at least one remote receiver, including;
a plurality of radio frequency receivers configured to receive the transmitted signal from the base station;
a mode detector coupled to the plurality of radio frequency receivers, the mode detector being configured to detect a shared data channel mode of operation between the base station and a cellular transceiver;
a signal quality detector coupled to the mode detector, the signal quality detector being configured to measure a signal performance metric of the transmitted signal using at least one of a signal to interference ratio, channel quality indication, block error rate, and bit error rate; and
a receiver selector coupled to the signal quality detector, the receiver selector being configured to modify a number of active receivers of the plurality of radio frequency receivers based on a low priority detected signal from the base station and in absence of a low priority detected signal, the base station decreases the number of active receivers when the signal performance metric exceeds a first target performance metric and increases the number of active receivers when a second target performance metric exceeds the signal performance metric.

21. The cellular communications system of claim 20, wherein the base station issues the low priority detected signal to the at least one remote receiver when there is no data for the remote receiver in a predetermined time window.

22. The cellular communications system of claim 20, wherein the receiver selector switches off a diversity branch receiver having a lowest signal quality.

23. A method of controlling a cellular diversity receiver, comprising:
receiving a transmitted signal via one or more diversity branch receivers in a remote receiver;
detecting a low windup condition between the remote receiver and a base station based on the transmitted signal, the low windup condition indicating that the base station is unable to reduce a transmitter power of the base station for transmitting signals to the remote receiver; and
modifying a number of active diversity branch receivers in response to detection of the low windup condition if more than one diversity branch receiver is active when the remote receiver is in a dedicated channel mode.

24. The method of claim 23, wherein the number of active diversity branch receivers is decreased when the low windup condition is detected.

25. The method of claim 24, wherein the number of active diversity branch receivers is increased when the low windup condition is not detected.

26. The method according to claim 23, further comprising:
enabling a disabled diversity branch receiver when the low windup condition is detected and a target performance level exceeds a remote receiver performance metric.

27. The method of claim 26, wherein the remote performance metric and the target performance metric are at least one of a signal to interference ratio, a block error rate and a bit error rate.

28. The method of claim 26, wherein the target performance metric decreases after one of the diversity branch receivers is disabled and increases after one of the disabled diversity branch receivers is enabled.

29. The method of claim 23, wherein the cellular diversity receiver operates in one of the dedicated channels mode and a shared data channel mode.

30. The method of claim 23, wherein modifying a number of active diversity branch receivers includes switching off an active DBR having a lowest signal quality.

31. A cellular transceiver, comprising:
a plurality of diversity branch receivers configured to receive a transmitted signal from a base station;
a receiver selector, coupled to the diversity branch receivers, that is configured to increase a number of active diversity branch receivers when at least one of the diversity branch receivers is inactive and a signal quality performance metric of the transmitted signal is less than or equal to a threshold performance metric, the receiver selector switches off a diversity branch receiver having a lowest signal quality;

a signal quality detector, coupled to a windup detector, that is configured to measure the signal quality performance metric using at least one of a signal to interference ratio, a channel quality indication, a block error rate, and a bit error rate to determine a low windup condition of the base station and the cellular transceiver, the low windup condition indicating that the base station is unable to reduce a transmitter power of the base station for transmitting signals to the cellular transceiver.

* * * * *